United States Patent
Metz (10) Patent No.: US 10,124,626 B2
(45) Date of Patent: Nov. 13, 2018

(54) WHEEL ASSEMBLY

(71) Applicant: Back Forty Development LLC, Danbury, CT (US)

(72) Inventor: Stephen Byers Metz, Danbury, CT (US)

(73) Assignee: Back Forty Development LLC, Danbury, CT (US)

( * ) Notice: Subject to any disclaimer, the term of this patent is extended or adjusted under 35 U.S.C. 154(b) by 48 days.

(21) Appl. No.: 14/920,115

(22) Filed: Oct. 22, 2015

(65) Prior Publication Data

US 2016/0114621 A1  Apr. 28, 2016

Related U.S. Application Data

(60) Provisional application No. 62/068,968, filed on Oct. 27, 2014.

(51) Int. Cl.

| B60B 21/06 | (2006.01) |
|---|---|
| B60B 1/00 | (2006.01) |
| B60B 1/02 | (2006.01) |
| B60B 1/04 | (2006.01) |
| B60B 21/02 | (2006.01) |

(52) U.S. Cl.
CPC ............ B60B 21/062 (2013.01); B60B 1/003 (2013.01); B60B 1/0261 (2013.01); B60B 1/041 (2013.01); B60B 1/044 (2013.01); B60B 21/023 (2013.01); B60B 2900/311 (2013.01); B60B 2900/321 (2013.01); B60B 2900/50 (2013.01)

(58) Field of Classification Search
CPC ....... B60B 21/062; B60B 21/06; B60B 21/00; B60B 21/02; B60B 21/023; B60B 1/00; B60B 1/003; B60B 1/02; B60B 1/04; B60B 1/041; B60B 1/043; B60B 1/044
See application file for complete search history.

(56) References Cited

U.S. PATENT DOCUMENTS

| 4,275,931 A * | 6/1981 | Reppert | B60B 21/02 301/35.57 |
|---|---|---|---|
| 4,305,622 A * | 12/1981 | Mitchell | B60B 21/06 152/381.4 |
| 2008/0054711 A1 * | 3/2008 | Dal Pra' | B60B 1/003 301/58 |

(Continued)

FOREIGN PATENT DOCUMENTS

CN  101134423 A  3/2008

*Primary Examiner* — Jason R Bellinger
(74) *Attorney, Agent, or Firm* — Muncy, Geissler, Olds & Lowe, P.C.

(57) ABSTRACT

A wheel assembly includes a central hub, an outer rim including a spoke bed wall, and a spoke unit including first and second spokes. Each of the first and second spokes extends between the outer rim and the central hub, and has a first end connected to the spoke bed wall, a second end opposite to the first end and connected to the central hub and a span portion connected between the first and second ends. The first ends of the first and second spokes are respectively formed with first and second spoke bed connection portions where the first and second spokes are respectively connected to the spoke bed wall. With respect to the central hub, the second spoke bed connection portion is radially outboard relative to and circumferentially spaced from the first spoke bed connection portion.

12 Claims, 8 Drawing Sheets

(56) References Cited

U.S. PATENT DOCUMENTS

| | | | | |
|---|---|---|---|---|
| 2008/0054712 A1* | 3/2008 | Urbani | ............... | B60B 1/003 |
| | | | | 301/58 |
| 2013/0162008 A1* | 6/2013 | Li | ..................... | B60B 1/042 |
| | | | | 301/58 |
| 2013/0169026 A1* | 7/2013 | Li | ..................... | B60B 1/02 |
| | | | | 301/58 |

* cited by examiner

WHEEL ASSEMBLY

CROSS-REFERENCE TO RELATED APPLICATION

This application claims priority to U.S. provisional application No. 62/068,968, filed on Oct. 27, 2014.

FIELD

This disclosure relates to a wheel assembly, more particularly to a wheel assembly adapted to be mounted on a bicycle.

BACKGROUND

Figure 1:
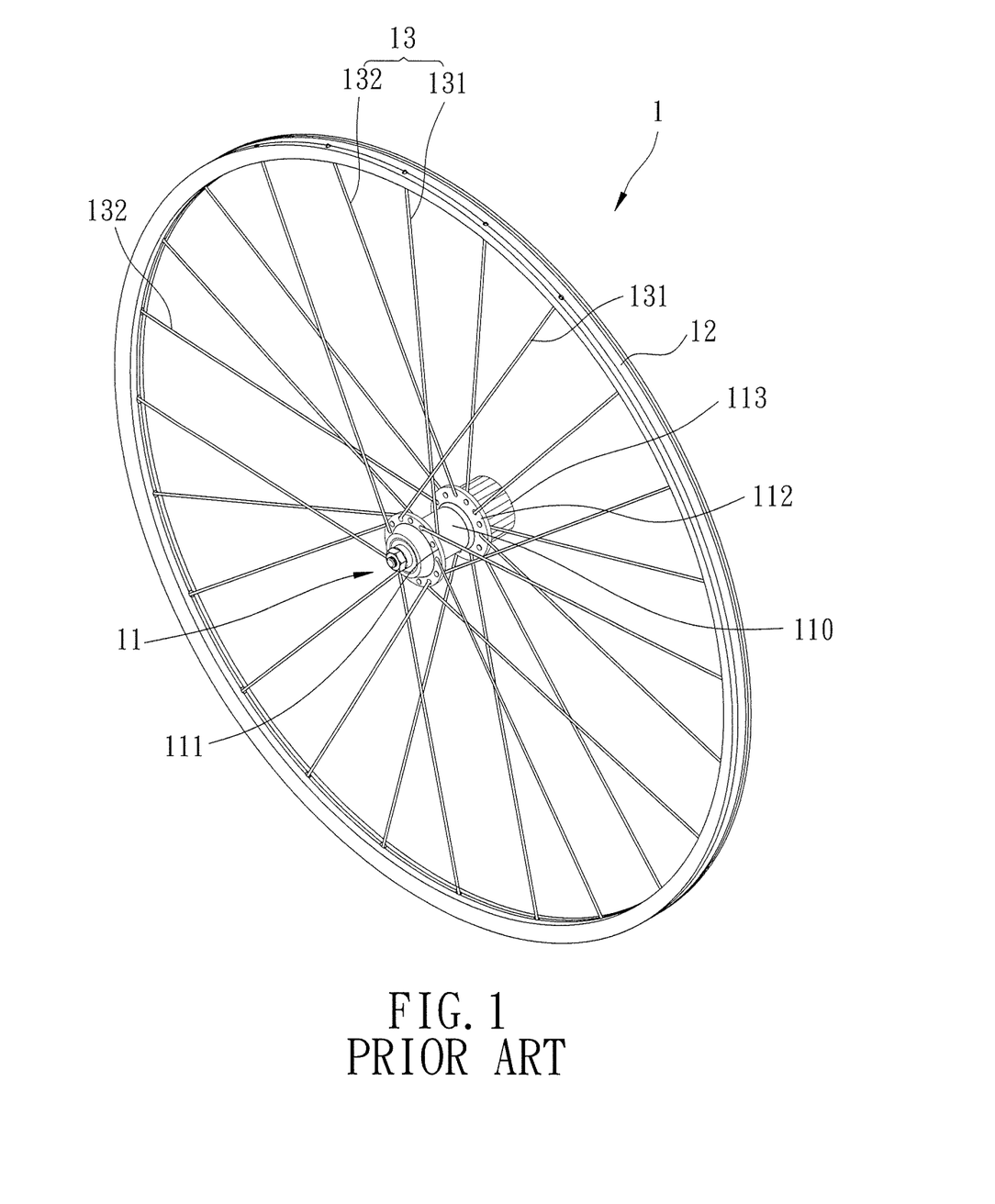
FIG. 1 is a perspective view of a conventional wheel.

Referring to FIG. 1, a conventional bicycle wheel 1 includes a central hub 11, a rim 12 and a spoke unit 13 that is connected between the central hub 11 and the rim 12. The spoke unit 13 includes a plurality of first spokes 131 and a plurality of second spokes 132, each of which extends between the rim 12 and the central hub 11. The central hub 11 includes a hub body 110 that has first and second ends opposite to each other, a first hub flange 111 that radially extends from the first end of the hub body 110 and is connected to the first spokes 131, a second hub flange 112 that radially extends from the second end of the hub body 110 and is connected to the second spokes 132, and a driven portion 113 disposed at the second end of the hub body 110 and adjacent to the second hub flange 112.

While the driven portion 113 is driven by a rider to rotate the bicycle wheel 1, the tension applied to the rim 12 and the spoke unit 13 is unbalanced since the driving portion 113 is closer to the second hub flange 112 as compared to the first hub flange 111. Strength and durability of the rim 12 and the spoke unit 13 are reduced due to the unbalanced tension.

SUMMARY

Therefore, an object of the present disclosure is to provide a wheel assembly that can alleviate at least one of the drawbacks of the prior arts.

According to the disclosure, a wheel assembly includes a central hub, an outer rim including a spoke bed wall, and a spoke unit including a first spoke and a second spoke. Each of the first and second spokes extends between the outer rim and the central hub, and has a first end connected to the spoke bed wall, a second end opposite to the first end and connected to the central hub and a span portion connected between the first and second ends. The first end of the first spoke is formed with a first spoke bed connection portion where the first spoke is connected to the spoke bed wall and the first end of the second spoke is formed with a second spoke bed connection portion where the second spoke is connected to the spoke bed wall. With respect to the central hub, the second spoke bed connection portion is radially outboard relative to the first spoke bed connection portion and circumferentially spaced from the first spoke bed connection portion.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 2:
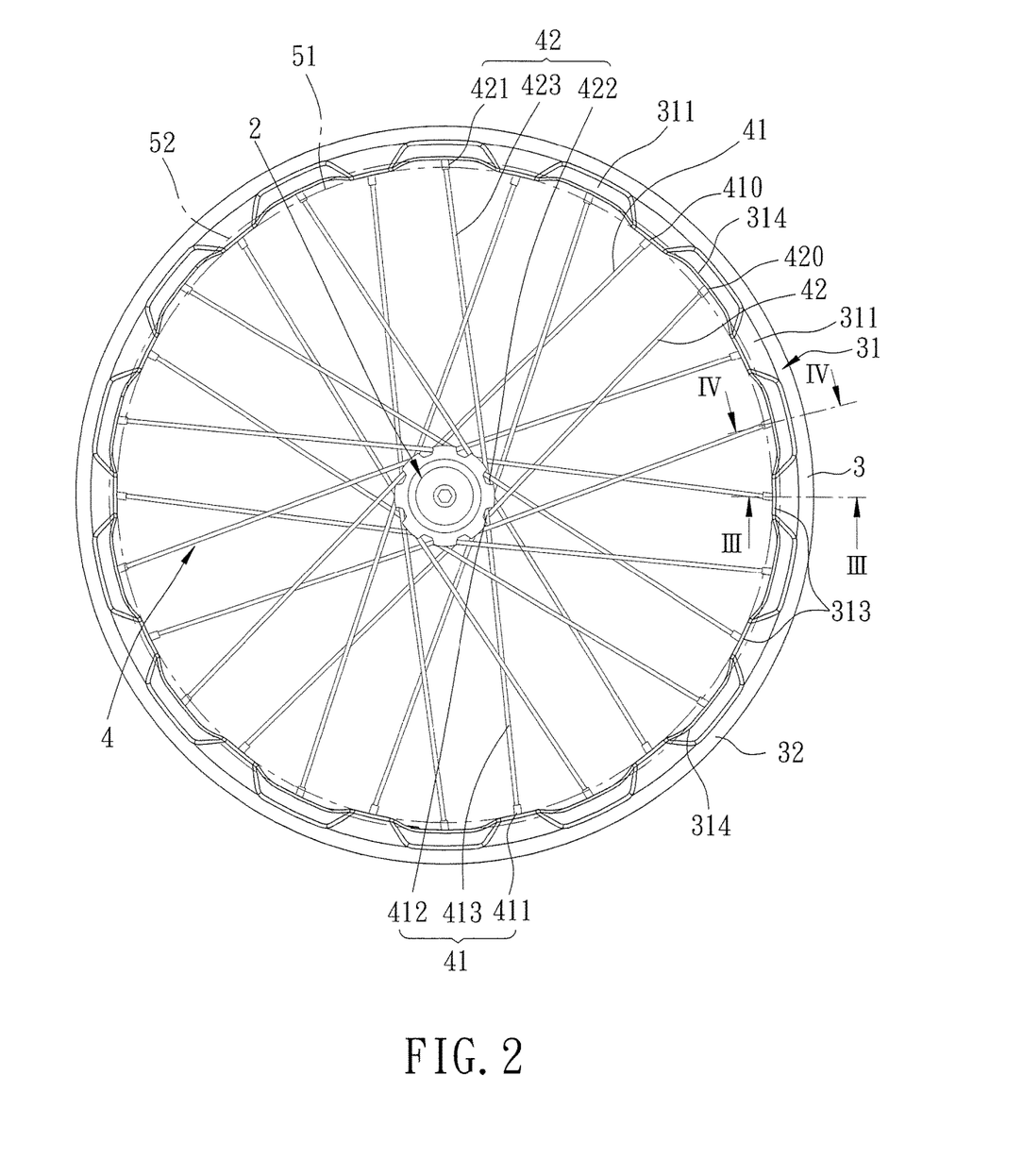
FIG. 2 is a schematic view illustrating an embodiment of a wheel assembly according to this disclosure.
Figure 5:
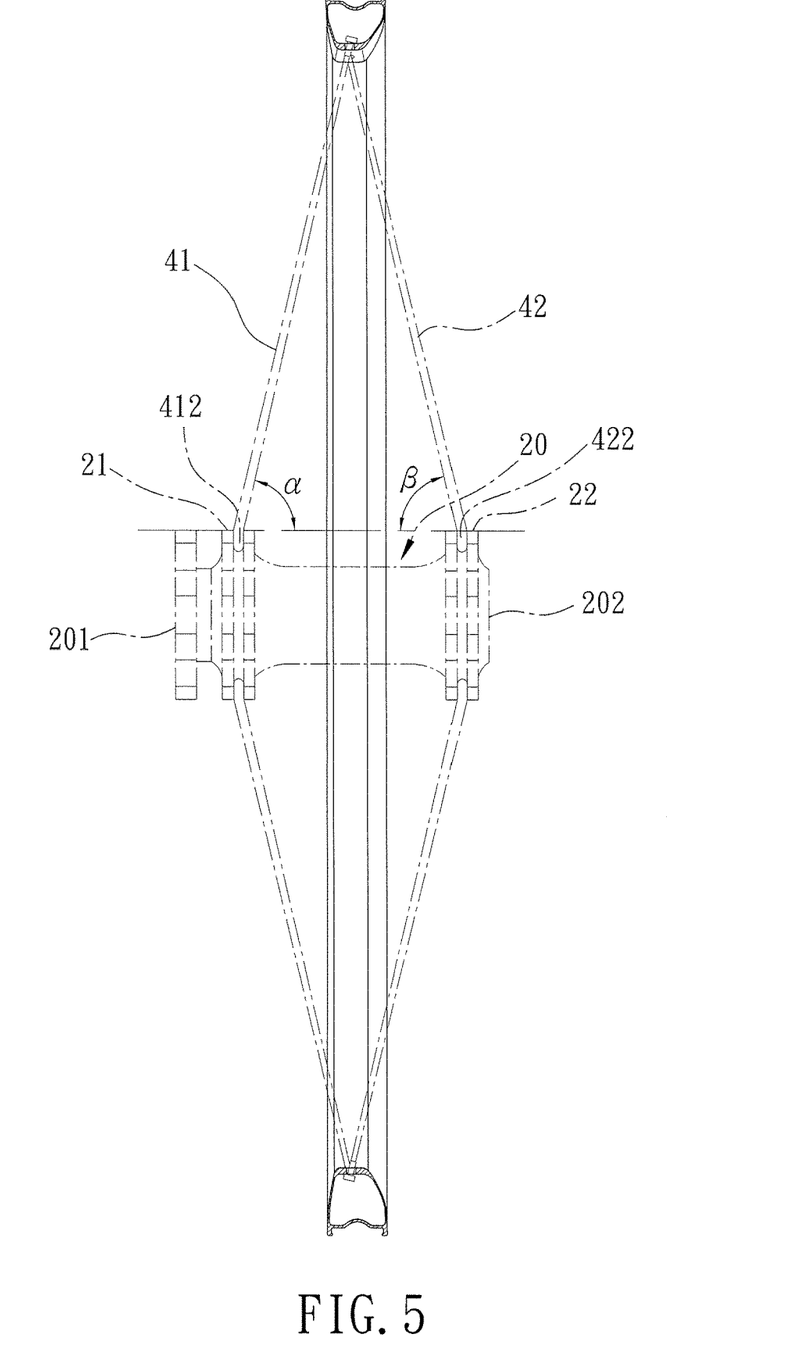
FIG. 5 is a side view illustrating connection of first and section spokes to a central hub and the outer rim of the embodiment of FIG. 2.

Referring to FIGS. 2 and 5, a wheel assembly of an embodiment of this disclosure includes a central hub 2, an outer rim 3 that includes a spoke bed wall 31, and a spoke unit 4 that includes a plurality of first spokes 41 and a plurality of second spokes 42. The first spokes 41 and the second spokes 42 respectively extend between the outer rim 3 and the central hub 2. Each of the first spokes 41 includes a first end 411 that is formed with a first spoke bed connection portion 410, a second end 412 that is opposite to the first end 411 and connected to the central hub 2, and a span portion 413 that extends between the first and second ends 411, 412. The first end 411 of each of the first spokes 41 is connected to the spoke bed wall 31 at the first spoke bed connection portion 410 thereof.

Each of the second spokes 42 includes a first end 421 that is formed with a second spoke bed connection portion 420, a second end 422 that is opposite to the first end 421 and connected to the central hub 2, and a span portion 423 that extends between the first and second ends 421, 422. The first end 421 of each of the second spokes 42 is connected to the spoke bed wall 31 at the second spoke bed connection portion 420 thereof.

With respect the central hub 2, the second spoke bed connection portions 420 of the first ends 421 of the second spokes 42 are radially outboard relative to and circumferentially spaced from the first spoke bed connection portions 410 of the first ends 411 of the first spokes 41.

Figure 3:
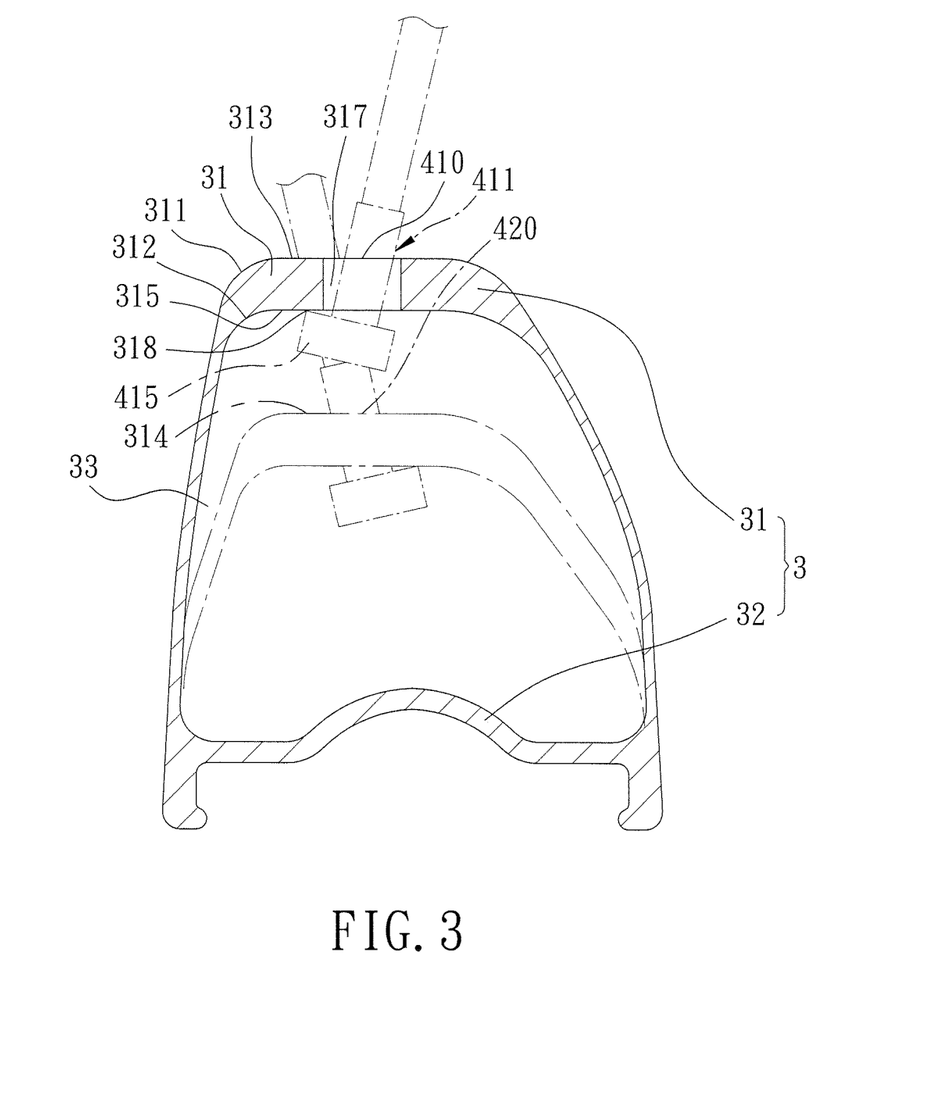
FIG. 3 is aside sectional view taken along the line III-III shown in FIG. 2, illustrating an outer rim of the embodiment of FIG. 2.
Figure 4:
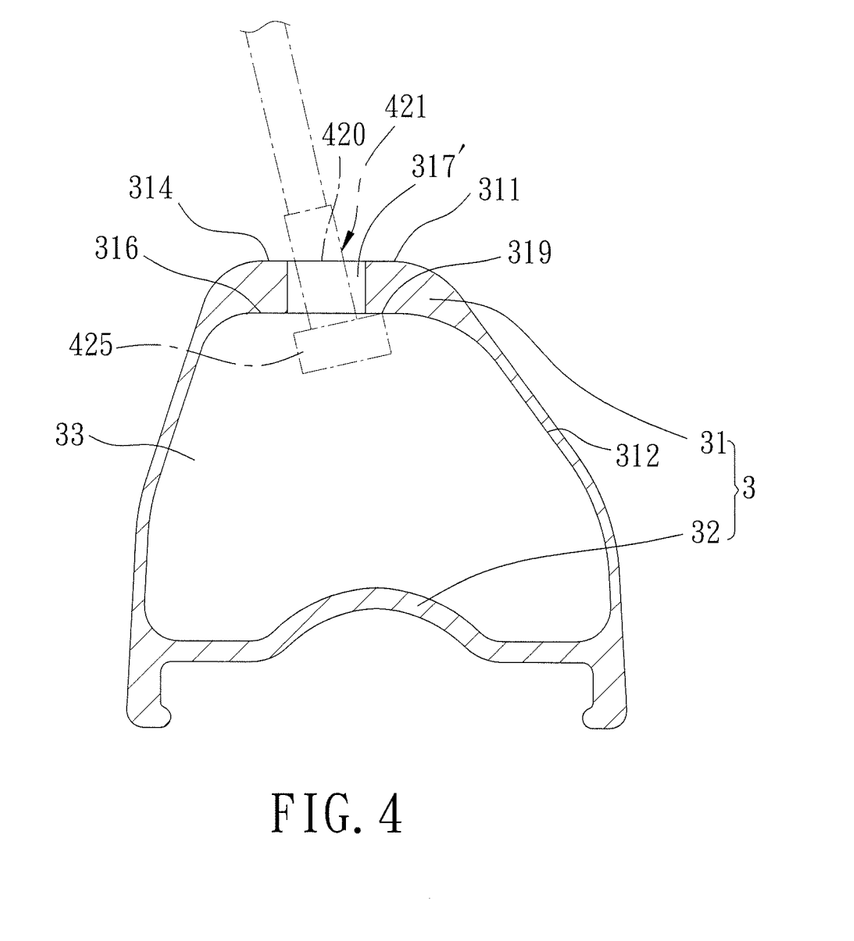
FIG. 4 is a side sectional view taken along the line IV-IV shown in FIG. 2, illustrating the outer rim of the embodiment of FIG. 2.

Further referring to FIGS. 3 and 4, the spoke bed wall 31 has a radially hub-facing surface 311 and a radially tire-facing surface 312 opposite to the radially hub-facing surface 311.

Referring to FIG. 3 in cooperation with FIG. 2, the radially hub-facing surface 311 has a plurality of first portions 313 (only one is shown in FIG. 3), each of which is adjacent to the first spoke bed connection portion 410 of a corresponding one of the first spokes 41, and a plurality of second portions 314, each of which is adjacent to the second spoke bed connection portion 420 of a corresponding one of the second spokes 42. With respect to the central hub 2, the first portions 313 are radially inboard relative to the second portions 314 and the first and second portions 313, 314 are circumferentially alternating.

A first imaginary circle 51, which is drawn with a center at the central hub 2 and a periphery connecting the first spoke bed connection portions 410, has a radius smaller than that of a second imaginary circle 52, which is drawn with a center at the central hub 2 and a periphery connecting the second spoke bed connection portions 420.

Referring back to FIGS. 3 and 4, the radially hub-facing surface 311 has a plurality of first portions 313, each of which is adjacent to the first spoke bed connection portion 410 of a corresponding one of the first spokes 41, and a plurality of second portions 314, each of which is adjacent to the second spoke bed connection portion 420 of a corresponding one of the second spokes 42. With respect to the central hub 2, the first portions 313 are radially inboard relative to the second portions 314, and the first and second portions 313, 314 are circumferentially alternating.

The radially tire-facing surface 312 has a plurality of first portions 315 (only one is shown in FIG. 3), each of which is adjacent to the first spoke bed connection portion 410 of a corresponding one of the first spokes 41, and a plurality of second portions 316 (only one is shown in FIG. 4), each of which is adjacent to the second spoke bed connection portion 420 of a corresponding one of the second spokes 42. With respect to the central hub 2, the first portions 315 are radially inboard relative to the second portions 316, and the first and second portions 315, 316 are arranged to be circumferentially alternating.

The spoke bed wall 31 further has a plurality of first spoke holes 317 (only one is shown in FIG. 3) for respective extension of the first spokes 41 therethrough and a plurality of second spoke holes 317' (only one is shown in FIG. 4) for respective extension of the second spokes 42 therethrough. In this embodiment, each of the first spoke holes 317 extends from a corresponding one of the first portions 313 of the radially hub-facing surface 311 to a corresponding one of the first portions 315 of the radially tire-facing surface 312. Each of the second spoke holes 317' extends from a corresponding one of the second portions 314 of the radially hub-facing surface 311 to a corresponding one of the second portions 316 of the radially tire-facing surface 312.

In this embodiment, the first spoke bed connection portion 410 of each of the first spokes 41 is formed as a spoke nipple having a nipple head 415. Each of the first portions 315 of the radially tire-facing surface 312 is formed with a first abutment 318 where the nipple head 415 of the corresponding first spoke bed connection portion 410 abuts against the radially tire-facing surface 312. The second spoke bed connection portion 420 of each of the second spokes 42 is formed as a spoke nipple having a nipple head 425. Each of the second portions 316 of the radially tire-facing surface 312 is formed with a second abutment 319 where the nipple head 425 of the corresponding second spoke bed connection portion 420 abuts against the radially tire-facing surface 312. With respect to the central hub 2, the first abutments 318 of the first portions 315 of the radially tire-facing surface 312 are radially inboard relative to the second abutments 319 of the second portions 316 of the radially tire-facing surface 312, and the first and second abutments 318, 319 are arranged to be circumferentially alternating.

The outer rim 3 further includes an outer wall 32 that is connected to the spoke bed wall 31 and radially outboard relative to the spoke bed wall 31 with respect to the central hub 2. The spoke bed wall 31 and the outer wall 32 cooperatively define an internal cavity 33 for receiving the nipple heads 415 of the first spokes 41 and the nipple heads 425 of the second spokes 42. The outer wall 32 may serve as a tire bed wall.

Referring back to FIGS. 2 and 5, the central hub 2 includes a hub body 20 that has a first end 201 and a second end 202 opposite to the first end 201, a first hub flange 21 that extends from the first end 201, and a second hub flange 22 that extends from the second end 202 and is axially spaced from the first hub flange 21. The first hub flange 21 is connected to the second ends 412 (only one is shown in FIG. 5) of the first spokes 41 and the second hub flange 22 is connected to the second ends 422 (only one is shown in FIG. 5) of the second spokes 42. Each of the first spokes 41 has a first bracing angle ($\alpha$) defined by a first included angle between the first spoke 41 and a tangential plane tangent to the first and second hub flanges 21, 22. Each of the second spokes 42 has a second bracing angle ($\beta$) defined by an included angle between the second spoke 42 and the tangential plane. The first bracing angle ($\alpha$) approximates to the second bracing angle ($\beta$) through the arrangement of the first and second spoke bed connection portions 410, 420.

Figure 6:
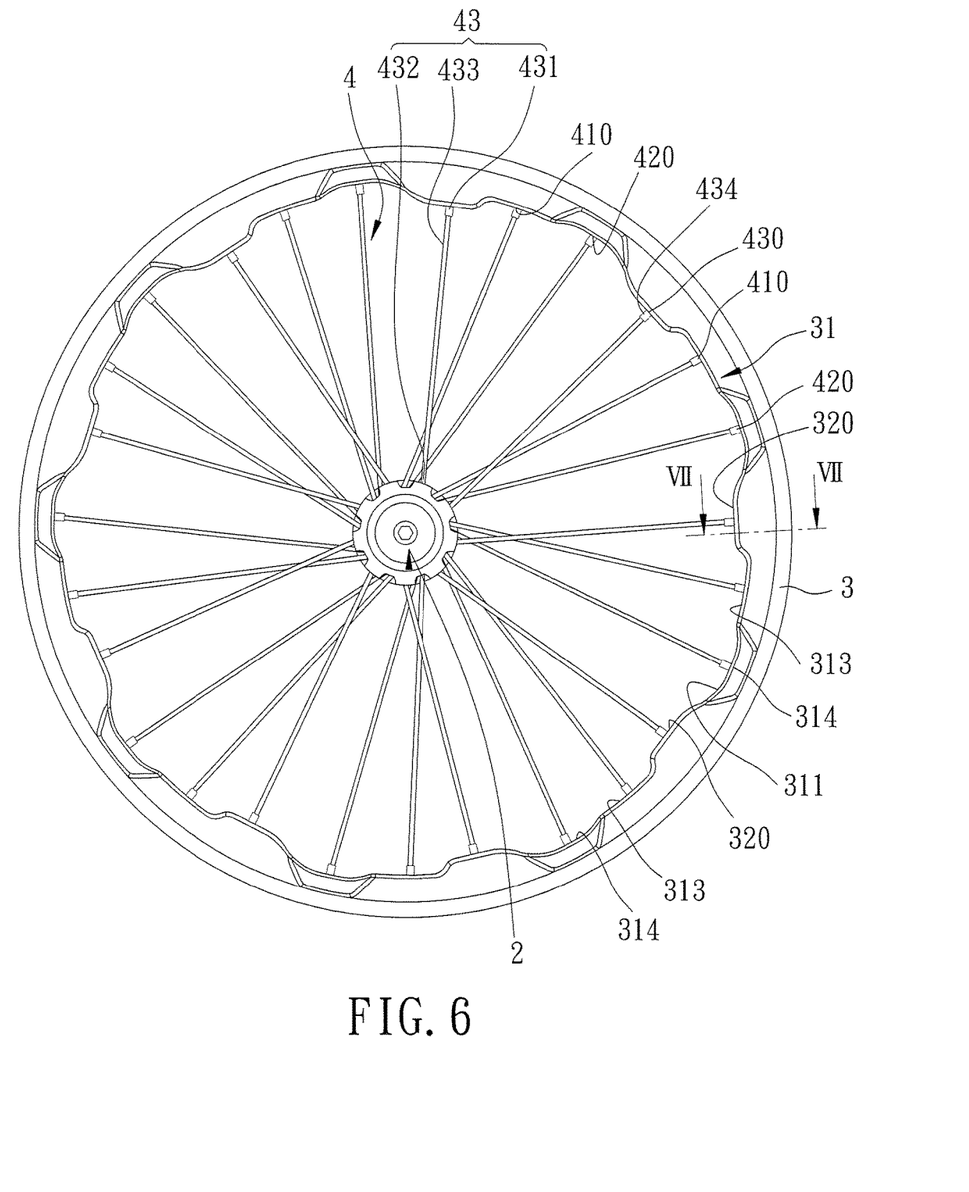
FIG. 6 is a schematic view illustrating another configuration of the embodiment of the wheel assembly according to this disclosure.
Figure 7:
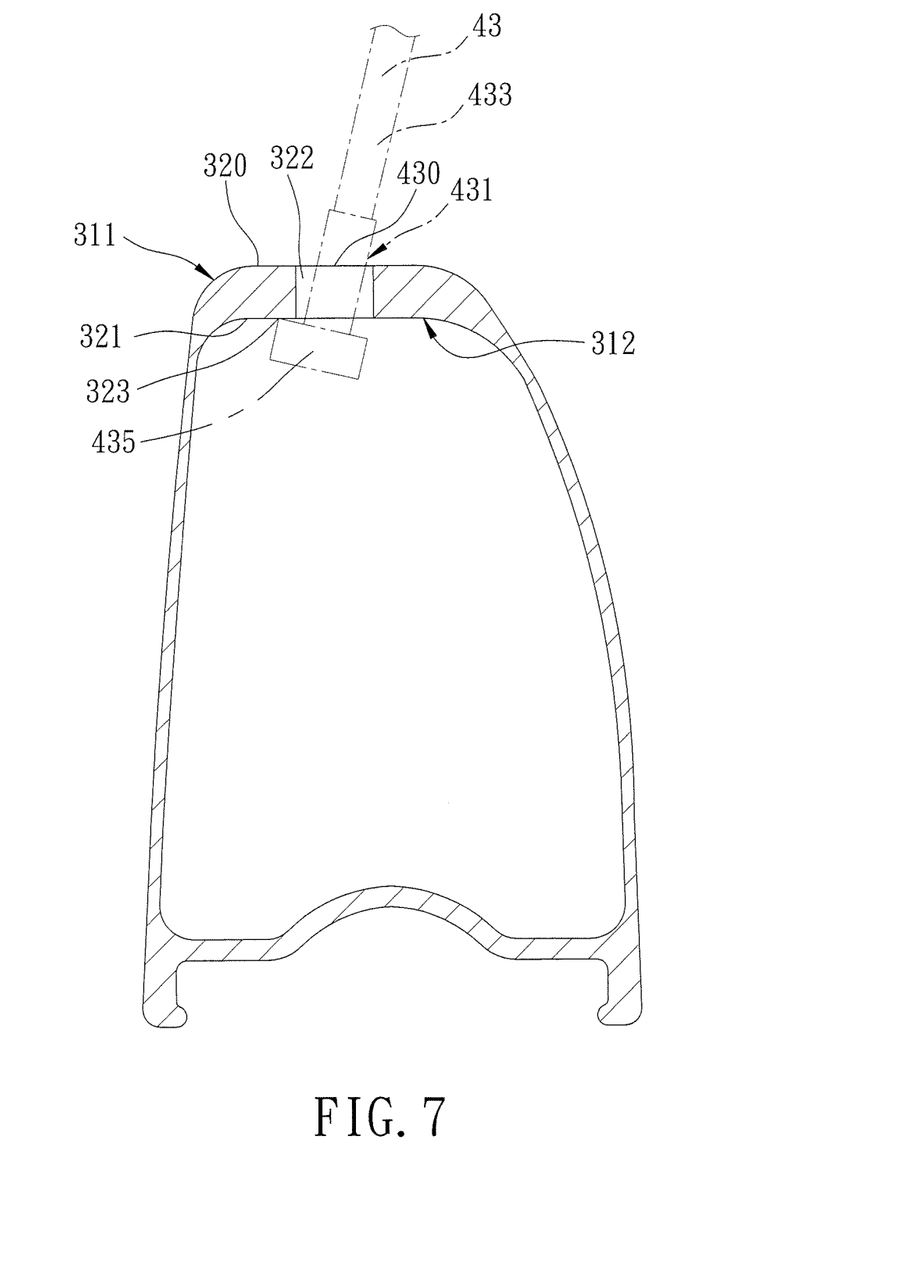
FIG. 7 is a top sectional view taken along the line VII-VII shown in FIG. 6, illustrating an outer rim of the another configuration of the embodiment of FIG. 6.
Figure 8:
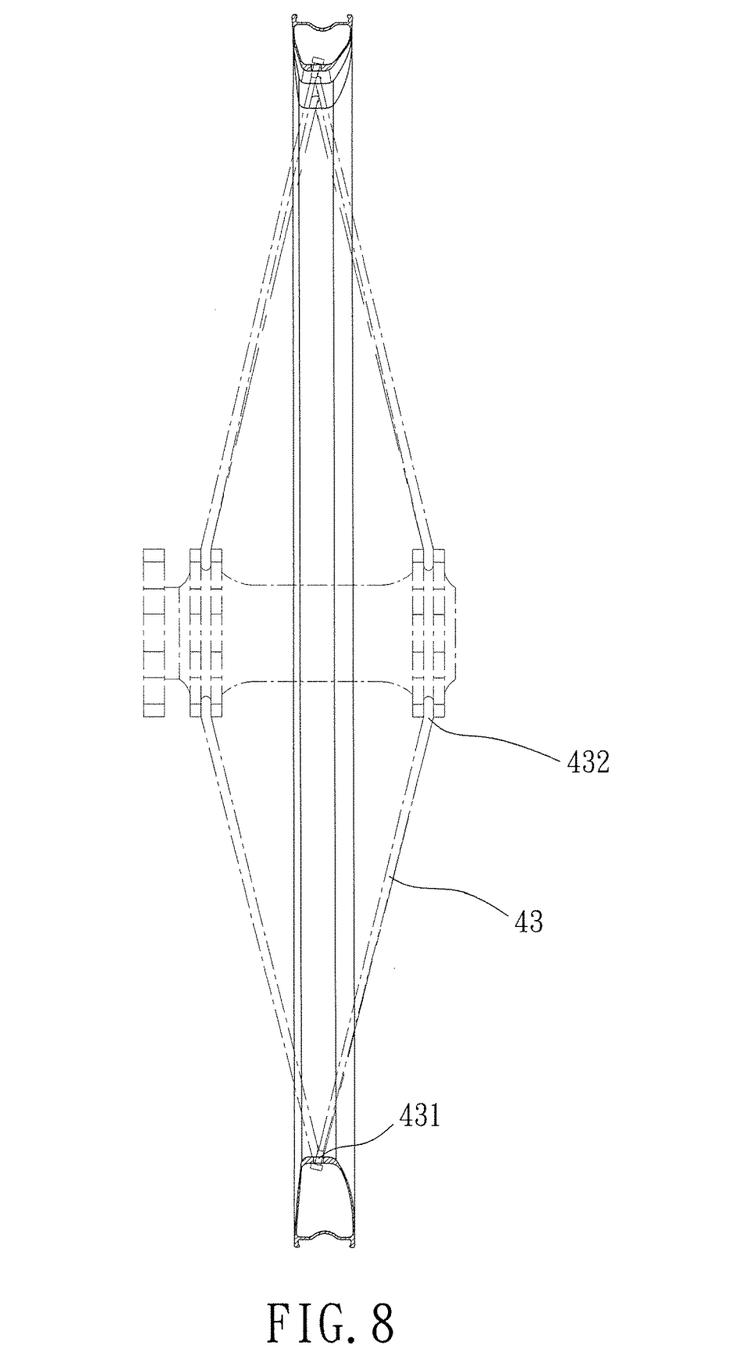
FIG. 8 is a side view illustrating connection of first and section spokes to a central hub and the outer rim of the another configuration of the embodiment of FIG. 6.

Referring to FIGS. 6, 7 and 8, another configuration of the wheel assembly of the embodiment is illustrated. In this configuration, the spoke unit 4 further includes a plurality of third spokes 43 that respectively extend between the outer rim 3 and the central hub 2. Each of the third spokes 43 includes a first end 431 that is formed with a third spoke bed connection portion 430, a second end 432 that is opposite to the first end 431 and connected to the central hub 2, and a span portion 433 that extends between the first and second ends 431, 432. The first end 431 of each of the third spokes 43 is connected to the spoke bed wall 31 at the third spoke bed connection portion 430 thereof. With respect the central hub 2, the third spoke bed connection portions 430 of the first ends 431 of the third spokes 43 are radially inboard relative to the first spoke bed connection portions 410 and circumferentially spaced from the first and second spoke bed connection portions 410, 420.

As shown in FIG. 7, the radially hub-facing surface 311 has a plurality of third portions 320 (only one is shown), each of which is adjacent to the third spoke bed connection portion 430 of a corresponding one of the third spokes 43 (only one is shown). See FIG. 6, with respect to the central hub 2, the third portions 320 are radially inboard relative to the first portions 313, and the first, second and third portions 313, 314, 320 are arranged to be circumferentially repeated in groups each consisting of one first portion 313, one second portion 314 and one third portion 320 in a predetermined order.

The radially tire-facing surface 312 has a plurality of third portions 321 (only one is shown), each of which is adjacent to the third spoke bed connection portion 430 of a corresponding one of the third spokes 43. With respect to the central hub 2, the third portions 321 are radially inboard relative to the first portions 315, and the first, second and third portions 315, 316, 321 are arranged to be circumferentially repeated in groups, each consisting of one first portion 315, one second portion 316 and one third portion 321 in a predetermined order.

The spoke bed wall 31 further has a plurality of third spoke holes 322 (only one is shown) for respective extension of the third spokes 43 therethrough. In this embodiment, each of the third spoke holes 322 extends from a corresponding one of the third portions 320 of the radially hub-facing surface 311 to a corresponding one of the third portions 321 of the radially tire-facing surface 312.

The third spoke bed connection portions 430 of each of the third spokes 43 is formed as a spoke nipple having a nipple head 435. Each of the third portions 321 of the radially tire-facing surface 312 is formed with a third abutment 323 where the nipple head 435 of the corresponding third spoke bed connection portion 430 abuts against the radially tire-facing surface 312. With respect to the central hub 2, the third abutments 323 of the third portions 321 are radially inboard relative to the first abutments 318, and the first, second and third abutments 317, 318, 323 are circumferentially repeated in groups each consisting of one first abutment 317, one second abutment 318 and one third abutment 323 in a predetermined order.

By means of the abovementioned arrangement of the first and second spoke bed connection portions 410, 420, the spoke bed wall 31, and optionally, the optional third spoke bed connection portions 430, unbalance of the tension applied to the outer rim 3 and the spoke unit 4 is reduced, and the first and second spoke bed connection portions 410, 420 and the optional third spoke bed connection portions 430 are capable of supporting tensile loads of the spoke unit 4. As such, the strength and durability of the out rim 3 and the spoke unit 4 are enhanced.

While the principles of the disclosure have been illustrated in relation to the exemplary embodiments shown herein, the principles of the disclosure are not limited thereto and include any modification and variation thereof.

What is claimed is:

1. A wheel assembly, comprising:
   a central hub;
   an outer rim including a spoke bed wall; and
   a spoke unit including a plurality of first spokes and a plurality of second spokes, each of said first and second spokes extending between said outer rim and said central hub, and having a first end connected to said spoke bed wall, a second end opposite to said first end and connected to said central hub and a span portion connected between said first and second ends, said first end of each of said first spokes being formed with a first spoke bed connection portion where said first spoke is connected to said spoke bed wall, said first end of each of said second spokes being formed with a second spoke bed connection portion where said second spoke is connected to said spoke bed wall,
   wherein with respect to said central hub, said second spoke bed connection portions of said second spokes are radially outboard relative to said first spoke bed connection portions of said first spokes and circumferentially spaced from said first spoke bed connection portions;
   wherein said spoke bed wall has a radially hub-facing surface and a radially tire-facing surface opposite to said radially hub-facing surface, said radially hub-facing surface having a plurality of first portions, each of which is adjacent to said first spoke bed connection portion of a corresponding one of said first spokes, and a plurality of second portions, each of which is adjacent to said second spoke bed connection portion of a corresponding one of said second spokes, with respect to said central hub, said first portions of said radially hub-facing surface being radially inboard relative to said second portions of said radially hub-facing surface;
   wherein said radially tire-facing surface has a plurality of first portions, each of which is adjacent to said first spoke bed connection portion of a corresponding one of said first spokes, and a plurality of second portions, each of which is adjacent to said second spoke bed connection portion of a corresponding one of said second spokes, with respect to said central hub, said first portions of said radially tire-facing surface being radially inboard relative to said second portions of said radially tire-facing surface; and
   wherein said first and second portions of said radially hub-facing surface are arranged to be circumferentially alternating, said first and second portions of said radially tire-facing surface being arranged to be circumferentially alternating.

2. The wheel assembly of claim 1, wherein said spoke bed wall further has a plurality of first spoke holes for extension of a corresponding one of said first spokes therethrough and a plurality of second spoke holes for extension of a corresponding one of said second spokes therethrough.

3. The wheel assembly of claim 2, wherein each of said first spoke holes extends from a corresponding one of said first portions of said radially hub-facing surface to a corresponding one of said first portions of said radially tire-facing surface, each of said second spoke holes extending from a corresponding one of said second portions of said radially hub-facing surface to a corresponding one of said second portions of said radially tire-facing surface.

4. The wheel assembly of claim 2, wherein said first spoke bed connection portion of each of said first spokes is formed as a spoke nipple having a nipple head, each of said first portions of said radially tire-facing surface being formed with a first abutment where said nipple head of said first spoke bed connection portion of the corresponding one of said first spokes abuts against said radially tire-facing surface; and wherein said second spoke bed connection portion of each of said second spokes is formed as a spoke nipple having a nipple head, each of said second portions of said radially tire-facing surface being formed with a second abutment where the nipple head of said second spoke bed connection portion of the corresponding one of said second spokes abuts against said radially tire-facing surface,
   with respect to said central hub, said first abutments of said first portions of said radially tire-facing surface being radially inboard relative to said second abutments of said second portions of said radially tire-facing surface.

5. The wheel assembly of claim 1, wherein said outer rim further includes an outer wall that is connected to said spoke bed wall and that is radially outboard relative to said spoke bed wall with respect to said central hub, said spoke bed wall and said outer wall cooperatively defining an internal cavity for receiving said nipple heads of said first and second spokes.

6. A wheel assembly, comprising:
   a central hub;
   an outer rim including a spoke bed wall; and
   a spoke unit including a first spoke and a second spoke, each of said first and second spokes extending between said outer rim and said central hub, and having a first end connected to said spoke bed wall, a second end opposite to said first end and connected to said central hub and a span portion connected between said first and second ends, said first end of said first spoke being formed with a first spoke bed connection portion where said first spoke is connected to said spoke bed wall, said first end of said second spoke being formed with a second spoke bed connection portion where said second spoke is connected to said spoke bed wall,
   wherein with respect to said central hub, said second spoke bed connection portion is radially outboard relative to said first spoke bed connection portion and circumferentially spaced from said first spoke bed connection portion; and
   wherein said central hub includes a hub body that has a first end and a second end opposite to said first end, a first hub flange that extends from said first end of said hub body, and a second hub flange that extends from said second end of said hub body and is axially spaced from said first hub flange, said first hub flange being connected to said second end of said first spoke and said second hub flange being connected to said second end of said second spoke.

7. A wheel assembly, comprising:
a central hub;
an outer rim including a spoke bed wall; and
a spoke unit including a first spoke and a second spoke, each of said first and second spokes extending between said outer rim and said central hub, and having a first end connected to said spoke bed wall, a second end opposite to said first end and connected to said central hub and a span portion connected between said first and second ends, said first end of said first spoke being formed with a first spoke bed connection portion where said first spoke is connected to said spoke bed wall, said first end of said second spoke being formed with a second spoke bed connection portion where said second spoke is connected to said spoke bed wall,
wherein with respect to said central hub, said second spoke bed connection portion is radially outboard relative to said first spoke bed connection portion and circumferentially spaced from said first spoke bed connection portion;
wherein said spoke bed wall has a radially hub-facing surface and a radially tire-facing surface opposite to said radially hub-facing surface, said radially hub-facing surface having a first portion, which is adjacent to said first spoke bed connection portion of said first spoke, and a second portion, which is adjacent to said second spoke bed connection portion of said second spoke, with respect to said central hub, said first portion of said radially hub-facing surface being radially inboard relative to said second portion of said radially hub-facing surface; and
wherein said spoke unit further includes a third spoke that extends between said outer rim and said central hub, said third spoke including a first end that is formed with a third spoke bed connection portion, a second end that is opposite to said first end and connected to said central hub, and a span portion that extends between said first and second ends, said first end of said third spoke being connected to said spoke bed wall at said third spoke bed connection portion, with respect to said central hub, said third spoke bed connection portion being radially inboard relative to said first spoke bed connection portion and circumferentially spaced from said first and second spoke bed connection portions.

8. The wheel assembly of claim 7, wherein said radially hub-facing surface further has a third portion, which is adjacent to said third spoke bed connection portion of said third spoke,
with respect to said central hub, said third portion being radially inboard relative to said first portion, and said first, second and third portions of said radially hub-facing surface being arranged to be circumferentially repeated in groups each consisting of one of said first portion, one of said second portion and one of said third portion in a predetermined order.

9. The wheel assembly of claim 8, wherein said radially tire-facing surface further has a third portion, which is adjacent to said third spoke bed connection portion of said third spoke,
with respect to said central hub, said third portion being radially inboard relative to said first portion, and said first, second and third portions are circumferentially repeated in groups each consisting of one of said first portion, one of said second portion and one of said third portion in a predetermined order.

10. The wheel assembly of claim 9, wherein said spoke bed wall further includes a third spoke hole for extension of said third spoke therethrough.

11. The wheel assembly of claim 10, wherein said third spoke hole extends from said third portion of said radially hub-facing surface to said third portion of said radially tire-facing surface.

12. The wheel assembly of claim 11, wherein said third spoke bed connection portion is formed as a spoke nipple having a nipple head, said third portion of said radially tire-facing surface being formed with a third abutment where said nipple head of said third spoke bed connection portion abuts against said radially tire-facing surface,
with respect to said central hub, said third abutment being radially inboard relative to said first abutment, and said first, second and third abutments being circumferentially repeated in groups each consisting of one of said first abutment, one of said second abutment and one of said third abutment in a predetermined order.

* * * * *